(12) United States Patent
Tsukada et al.

(10) Patent No.: US 6,440,035 B2
(45) Date of Patent: Aug. 27, 2002

(54) CONTINUOUSLY VARIABLE TRANSMISSION FOR MOTOR VEHICLES

(75) Inventors: Yoshiaki Tsukada; Kazuhiko Nakamura; Toshiya Nagatsuyu, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 15 days.

(21) Appl. No.: 09/773,602

(22) Filed: Feb. 2, 2001

(30) Foreign Application Priority Data

Feb. 2, 2000 (JP) ....................... 2000-030223

(51) Int. Cl.⁷ ................... F16H 15/04; B62D 61/02
(52) U.S. Cl. .......................... 476/50; 180/219
(58) Field of Search ..................... 180/219; 476/50

(56) References Cited

U.S. PATENT DOCUMENTS 3,494,224 A * 2/1970 Fellows et al. ............. 475/114
6,174,260 B1 * 1/2001 Tsukada et al. ............. 475/193

FOREIGN PATENT DOCUMENTS

JP          A10184841         7/1998

* cited by examiner

*Primary Examiner*—Allan D. Herrmann
(74) *Attorney, Agent, or Firm*—Birch, Stewart, Kolasch & Birch, LLP

(57) ABSTRACT

To provide a continuously variable transmission for motor vehicles which transmits power with a speed change from a driving member to a driven member. In the continuously variable transmission, power transmission is effected by moving a carrier which supports a shifting rotating member in frictional contact with the driving member and the driven member. No other special mechanism other than the continuously variable transmission is needed to push to move the motor vehicle with a small force. At least either one of the driving member and the driven member is driven by a power disconnecting means to move away from the other member along the axis of a transmission shaft, thereby releasing at least one of the driving member and the driven member from frictional contact with the first and second friction transfer surfaces.

14 Claims, 6 Drawing Sheets

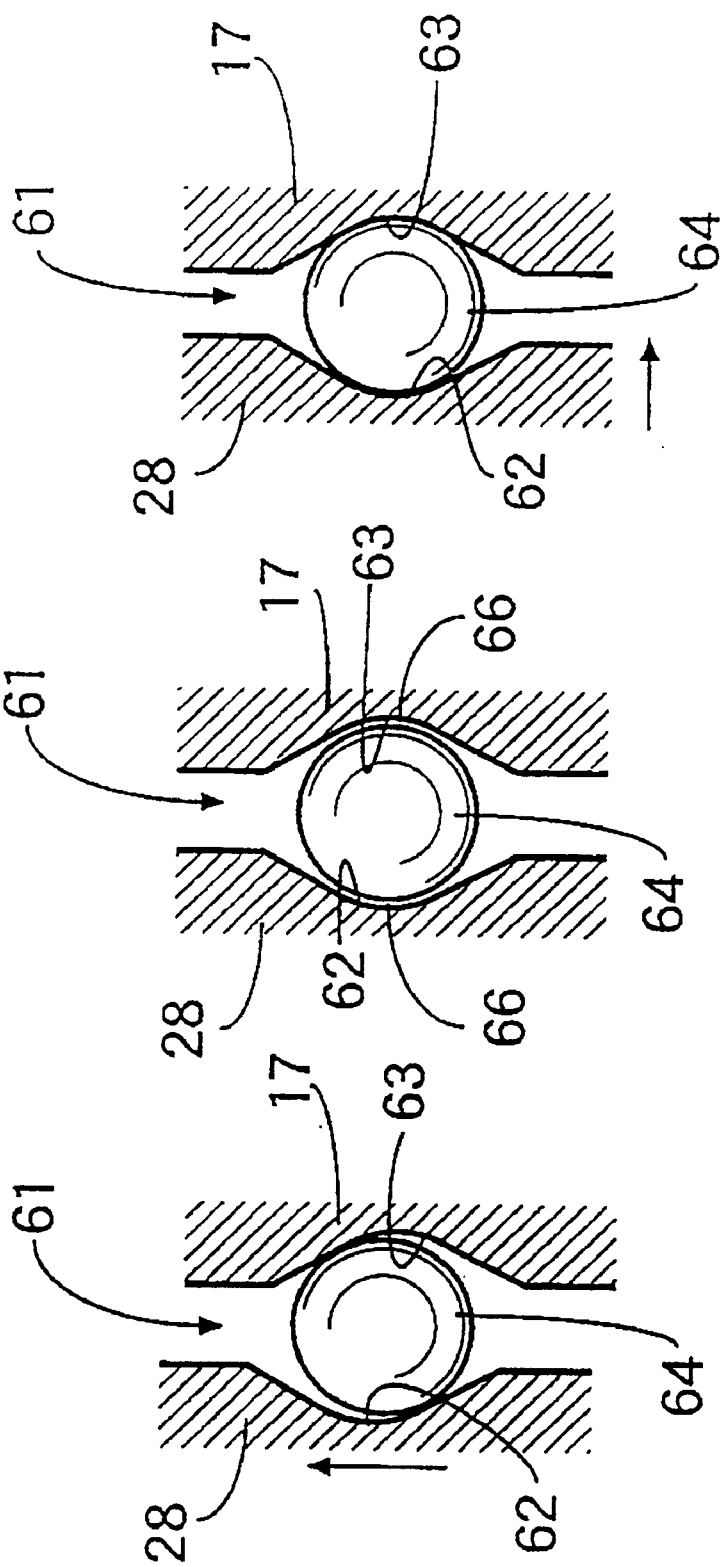
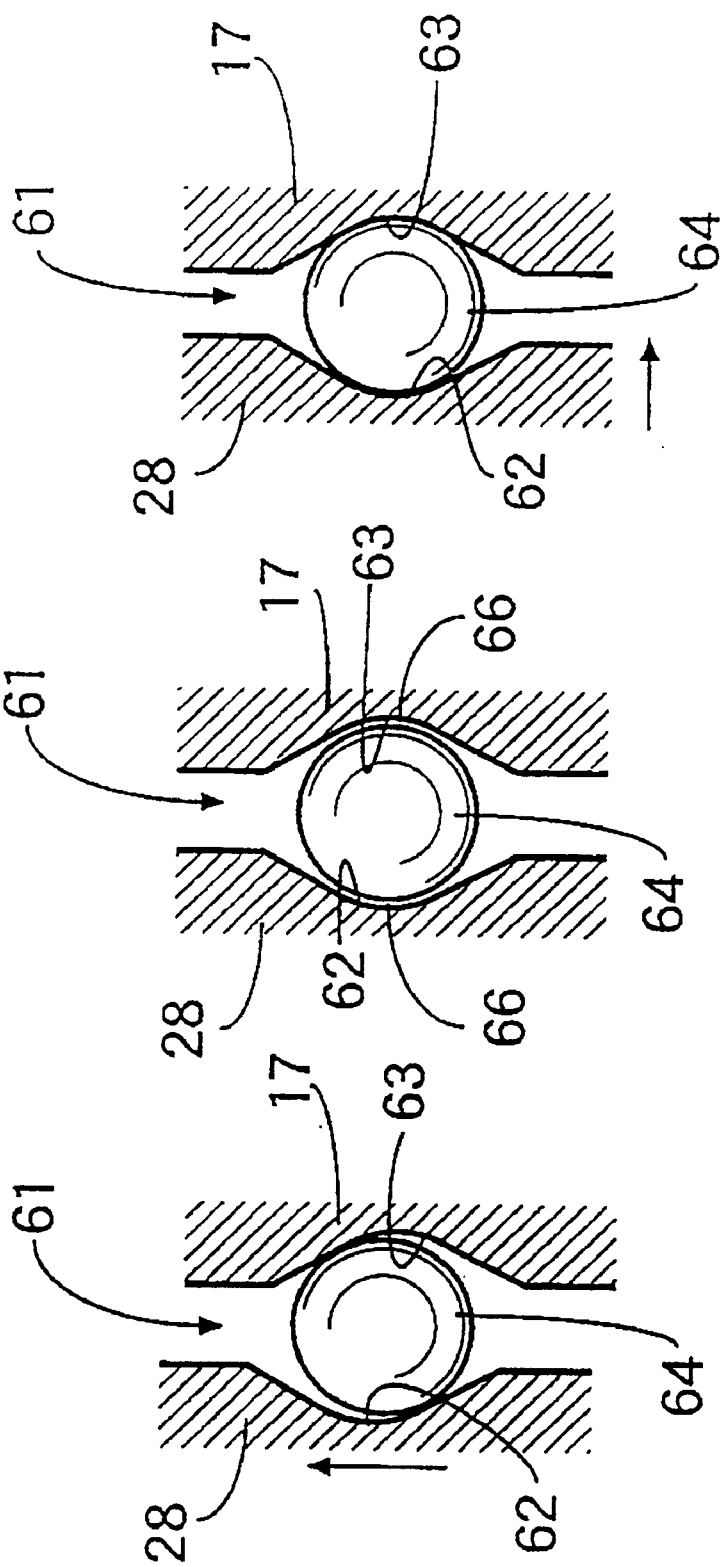
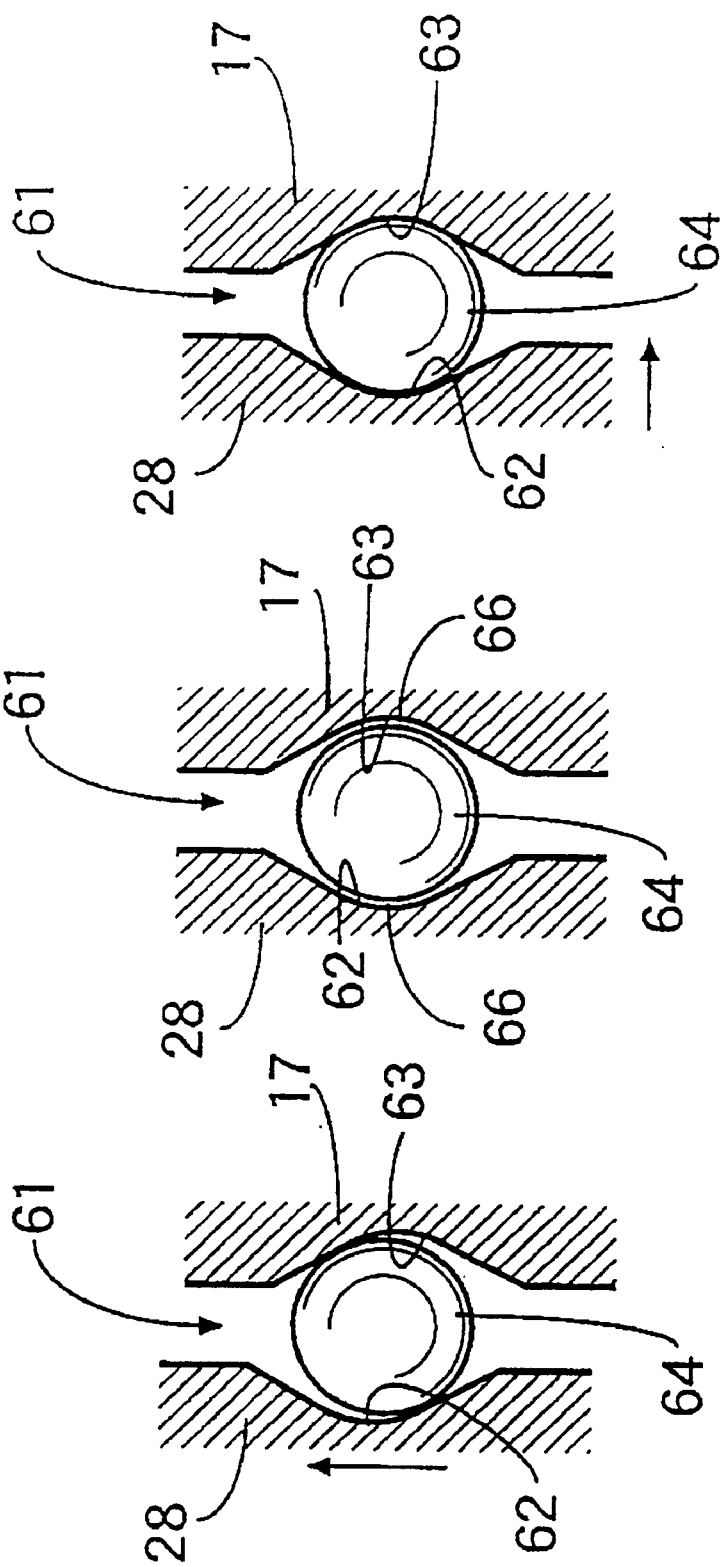

CONTINUOUSLY VARIABLE TRANSMISSION FOR MOTOR VEHICLES

BACKGROUND OF THE INVENTION

1. Field of the Invention

This invention relates to a continuously variable transmission for motor vehicles which is capable of shifting and transmitting power from a driving member to a driven member by moving a carrier carrying a shifting rotating member in friction contact with the driving and driven members.

2. Description of Background Art

A continuously variable transmission for motor vehicles is disclosed in Japanese Patent Laid-Open No. Hei 10-184841.

A motor vehicle such as a motorcycle mounted with this type of continuously variable transmission, when pushed to move, is required to be moved with a small force without the necessity of a great force for overcoming a frictional force on each part of the continuously variable transmission. In a conventional continuously variable transmission, a neutral clutch for the connection and disconnection of a power transmission is provided between an output gear in mesh with the driven member and an output shaft connected with a driving wheel. That is, it is necessary to provide a power transmission and interruption means between the continuously variable transmission and the driving wheel separately from the continuously variable transmission. Therefore, this type of transmission increases the number of components and accordingly resulting in an increased in the cost.

SUMMARY AND OBJECTS OF THE INVENTION

In view of the above-described problem inherent in the heretofore known art, it is an object of this invention to provide a continuously variable transmission for motor vehicles which requires no other mechanism than the continuously variable transmission and allows an easy movement of the motor vehicle by pushing with a small force.

To accomplish the above object, the continuously variable transmission for motor vehicles of a first embodiment of the invention comprises a transmission shaft rotated by power from an engine, a driving member rotated together with the transmission shaft, a driven member rotatably supported on the transmission shaft, a carrier movable along the axis of the transmission shaft, a support shaft which has an axis along a conical generator having its centerline on the axis of the transmission shaft and is supported on the carrier, and a shifting rotating member having conical first and second friction transfer surfaces which are in respectively frictional contact with the driving member and driven member, rotatably and axially slidably supported on the support shaft. The continuously variable transmission is characterized by including a power disconnecting means which is capable of releasing at least one of the driving member and the driven member from friction contact with the first and second friction transfer surfaces by driving at least one of the driving member and the driven member so that the rotating members will move away from each other along the axis of the transmission shaft.

According to the above-described constitution, power transmission to the continuously variable transmission can be interrupted by releasing at least either one of the friction contact of the driving member with the first friction transfer surface and the friction contact of the driven member with the second friction transfer surface by the power disconnecting means, thereby enabling the light movement of the motor vehicle such as a motorcycle simply by pushing with a slight force. Besides, the power disconnecting means drives at least one of the driving member and the driven member which make up the continuously variable transmission, along the axis of the transmission shaft. It is, therefore, possible to decrease the number of components and lower the cost as compared with a conventional transmission which needs the neutral clutch which is a mechanism separate from the continuously variable transmission.

In a second embodiment of the invention, in addition to the constitution of the first embodiment, the power disconnecting means is characterized in that, with the movement of the carrier from the position of LOW gear ratio to the side opposite to TOP gear ratio, at least either one of the driving member and the driven member is driven to move in the axial direction of the transmission shaft. According to the above-described constitution, power transmission can be interrupted by the use of a continuously variable transmission of a simple structure in the position of the carrier, and therefore, no other special power is needed for operating the power disconnecting means than the driving source for driving the carrier. Besides, the NEUTRAL state for interruption of the power transmission from the engine to the driving wheel is achieved in accordance with the movement of the carrier from the position of LOW gear ratio to the opposite side of TOP gear ratio. It is, therefore, possible to simplify the structure for changing from the position of LOW gear ratio to NEUTRAL position.

In a third embodiment of the invention, in addition to the constitution of the second embodiment, the continuously variable transmission is characterized in that the driven member is rotatably supported on the transmission shaft and movable within a limited range in the axial direction of the transmission shaft, and is urged with a spring into friction contact with the second friction transfer surface. A thrust bearing which is the power disconnecting means is mounted in the inner peripheral section of the carrier, to thereby enable pushing of the driven member in the axial direction of the transmission shaft with the movement of the carrier from the position of LOW gear ratio to the opposite side of TOP gear ratio. According to such a constitution, the driven member can be driven towards the direction away from the driving member while restricting the occurrence of a frictional force between the driven member and the carrier. Besides, because of a slow peripheral speed on the inner periphery of the carrier, it is possible to reduce the load acting on the thrust bearing.

Furthermore, a fourth embodiment of the invention, in addition to the constitution of the first embodiment, a pressure control cam mechanism is provided between the first rotating member which is at least one of the driving member and the driven member, and the second rotating member rotatable around the axis of the transmission shaft without changing its position along the axis of the transmission shaft. The pressure control cam mechanism transmits the power between the first and second rotating members while producing a surface pressure for pressing the driving member and the driven member against the first and second friction transfer surfaces. The movement of the first rotating member toward the position for releasing at least one of the driving member and the driven member from friction contact with the first and second friction transfer surfaces is absorbed by the pressure control cam mechanism. According to this constitution, at least one of the driving member and the driven member is allowed to move in the axial direction during power interruption while securing friction contact during power transmission between the driving and driven members and the first and second friction transfer surfaces.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 5(a), 5(b) and 5(c) are sectional views explaining the operation of a pressure control cam mechanism.

DETAILED DESCRIPTION OF THE PREFERRED EMBODIMENTS

One embodiment of a continuously variable transmission according to the present invention will be described with reference to the accompanying drawings.

Figure 1:
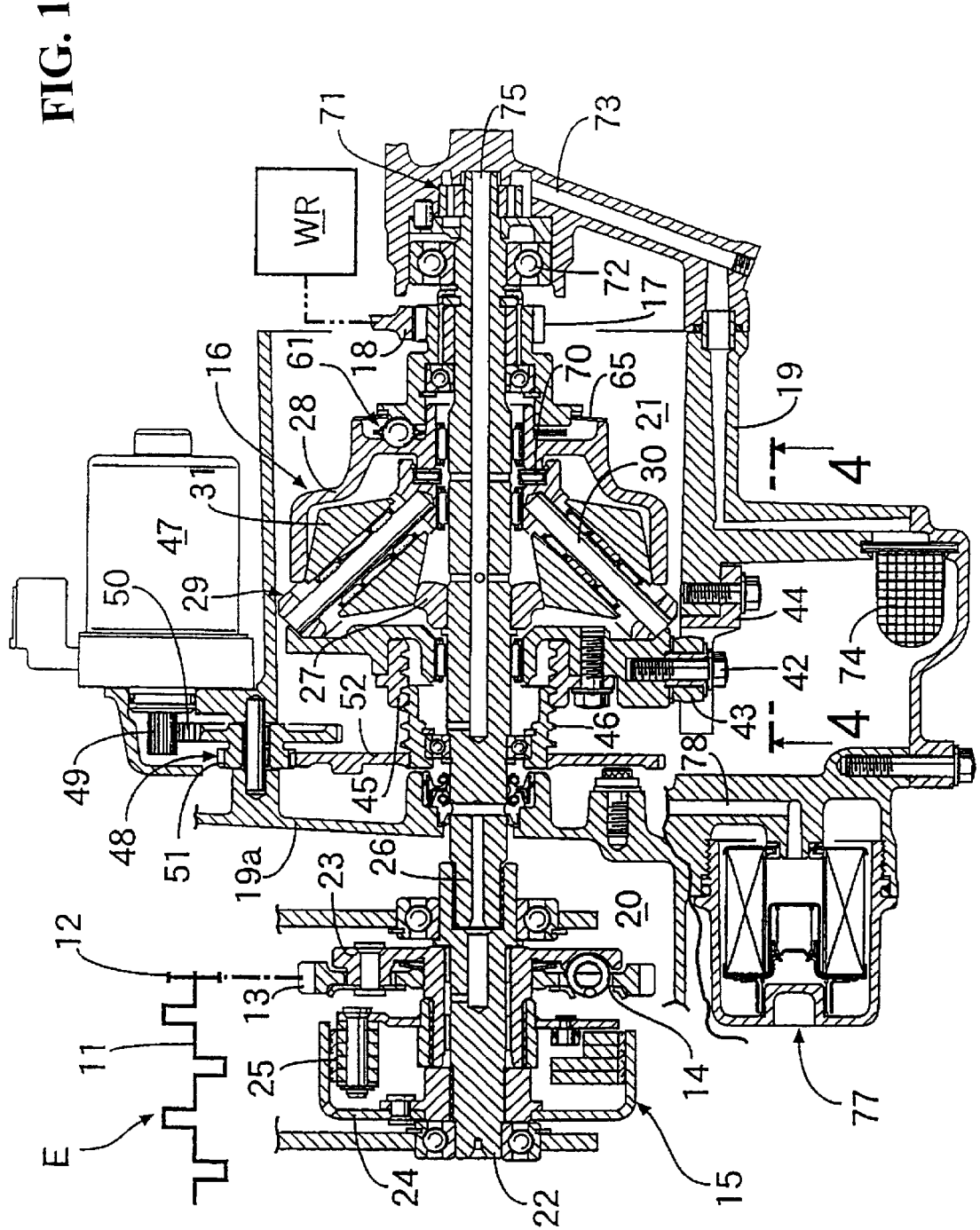
FIG. 1 is a longitudinal sectional view showing a power transmission structure between an engine and a continuously variable transmission.

As illustrated in FIG. 1, the output of an engine E mounted on a motor vehicle, e.g. a motorcycle, is transmitted from a crankshaft 11 of the engine E to an output gear 17 through a drive gear 12, a driven gear 13, a damper spring 14, an automatic centrifugal clutch 15, and a continuously variable transmission 16. The output gear 17 is in mesh with the reduction gear 18 connected with a rear wheel WR which is a driving wheel.

The drive gear 12, the driven gear 13, the damper spring 14 and the automatic centrifugal clutch 15 are housed in a first operating chamber 20 formed in a casing 19 which is connected with a crankcase of the engine E. The continuously variable transmission 16, the output gear 17, and the reduction gear 18 are housed in a second operating chamber 21 formed in the casing 19. The first and second operating chambers 20 and 21 are formed in the casing 19 on both sides of the wall section 19a of the casing 19.

An input shaft 22 is disposed in the first operating chamber 20. The input shaft 22 includes an axis in parallel with the crankshaft 11, being rotatably supported at both end portions on the casing 19. The automatic centrifugal clutch 15 is a known conventional type connected with the driven gear 13 through the damper spring 14, and is comprised of an input member 23 rotatably supported on the input shaft 22, a cup-shaped output member 24 connected with the input shaft 22, a plurality of centrifugal weights 25 rockably supported on the input member 23, allowing a friction contact with the inner surface of the output member 24, and a spring not shown for spring-loading each of the centrifugal weights 25 towards the direction releasing the frictional contact with the output member 24. When the speed of the input member 23 increases over a specific value with the power transmission from the engine E to the input member 23, the power is transmitted from the input member 23 to the output member 24, i.e. the input shaft 22.

Figure 2:
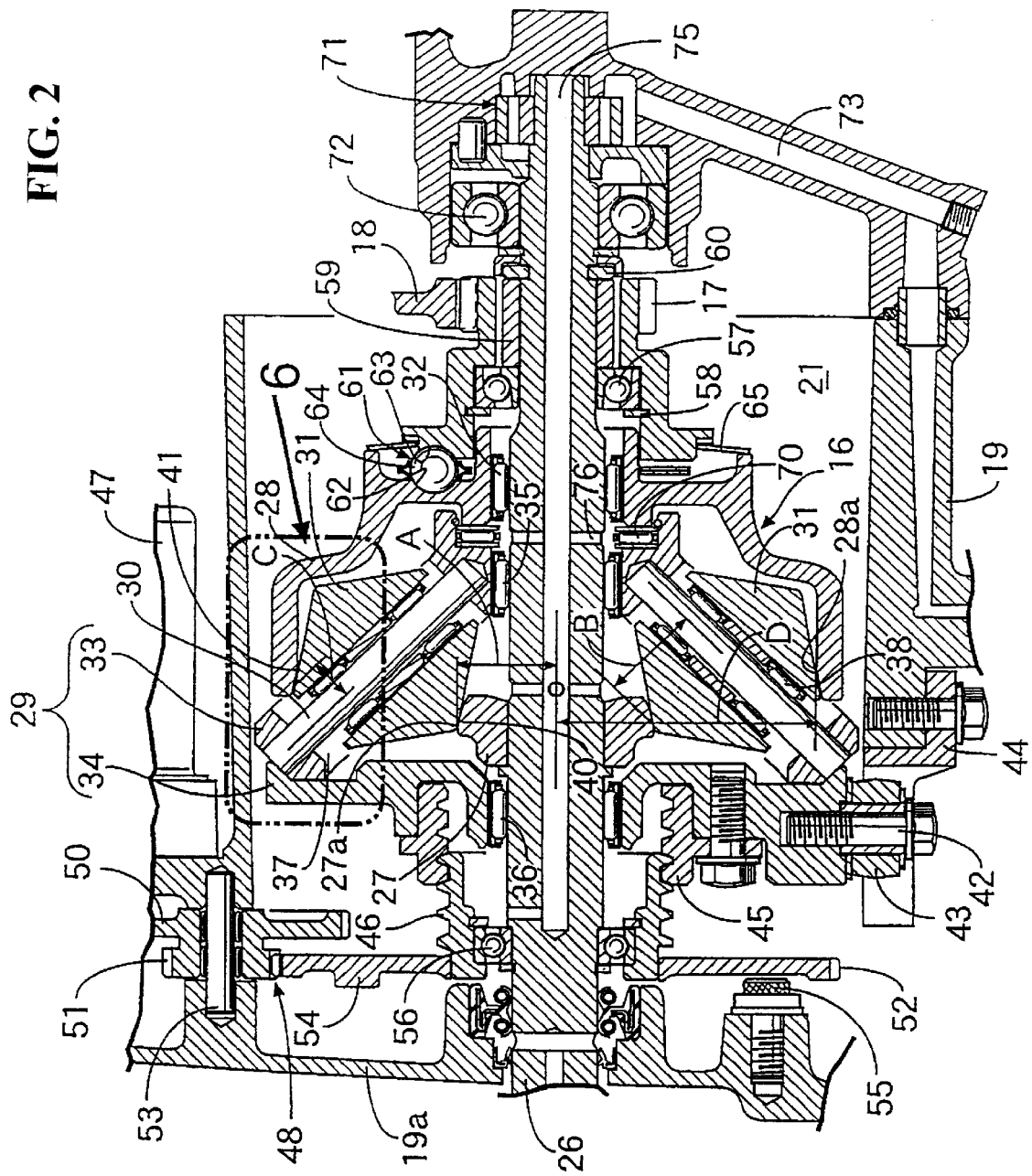
FIG. 2 is an enlarged longitudinal sectional view of the continuously variable transmission in a LOW gear ratio.
Figure 3:
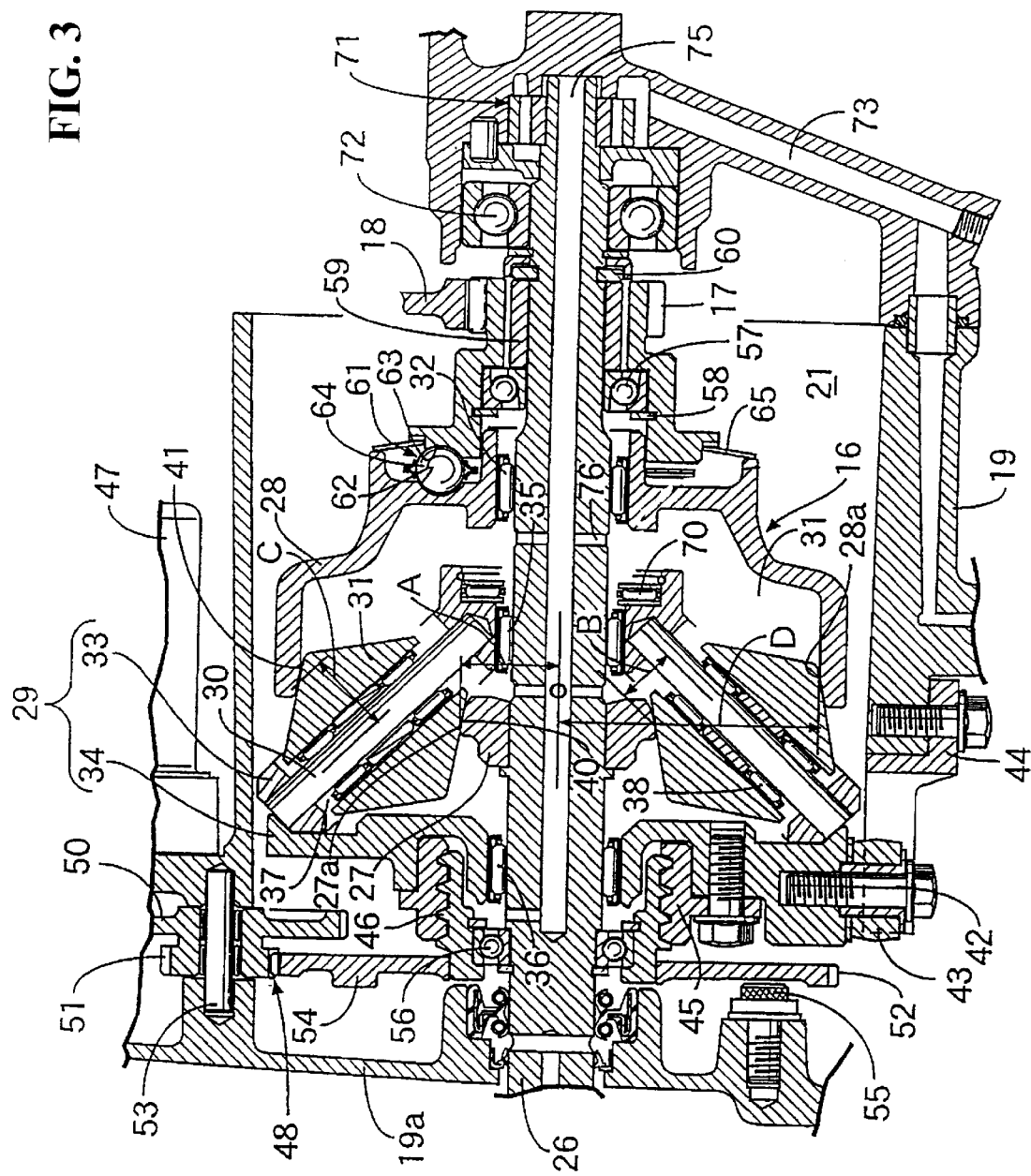
FIG. 3 is an enlarged longitudinal sectional view of the continuously variable transmission in a TOP gear ratio.

As shown in FIG. 2 and FIG. 3, the continuously variable transmission 16 includes a transmission shaft 26 having the same axis as the input shaft 22, a driving member 27 rotating as one body with the transmission shaft 26, a driven member 28 relatively rotatably supported on the transmission shaft 26, a carrier 29 movable along the axis of the transmission shaft 26, a plurality of support shafts 30 supported by the carrier 29, and shifting rotating members 31 supported each on the support shafts 30.

The transmission shaft 26 is inserted fluid-tightly and rotatably at one end portion in the first operating chamber 20 through the wall section 19a of the casing 19, being relatively unrotatably connected with the input shaft 22. The driving member 27 is formed in a ring-like shape with a friction contact surface 27a facing outwardly in the radial direction, and is relatively unrotatably connected with a pressure with the transmission shaft 26. The driven member 28 is formed in a cup-like shape open on the driving member 27 side and is relatively rotatably supported on the transmission shaft 26 through a needle bearing 32. A friction contact surface 28a is provided, radially directed inwardly, in the inner surface of the open end of the driven member 28.

The carrier 29 includes an approximately conical first carrier half 33 having a small diameter on the driven member 28 side, and a second carrier half 34 formed in a disk shape and connected to a large-diameter end of the first carrier half 33, i.e. the end side opposite to the driven member 28. The first and second carrier halves 33 and 34 are relatively rotatably and axially slidably supported on the transmission shaft 26 through needle bearings 35 and 36.

The first carrier half 33 is provided with a plurality of window holes 37, which are equally spaced in the circumferential direction. A plurality of support shafts 30 are supported at both ends on the first carrier half 33. The axis of these supports shafts 30 is along the cone generator on the centerline of the axis of the transmission shaft 26 and crossing across each of the window holes 37. On these support shafts 30, the shifting rotating members 31 are rotatably and axially slidably supported on a pair of needle bearings 38.

The shifting rotating member 31 is provided with a conical first friction transfer surface 40 in friction contact with the friction contact surface 27a of the driving member 27 and a conical second friction transfer surface 41 in friction contact with the friction contact surface 28a of the driven member 28.

Figure 4:
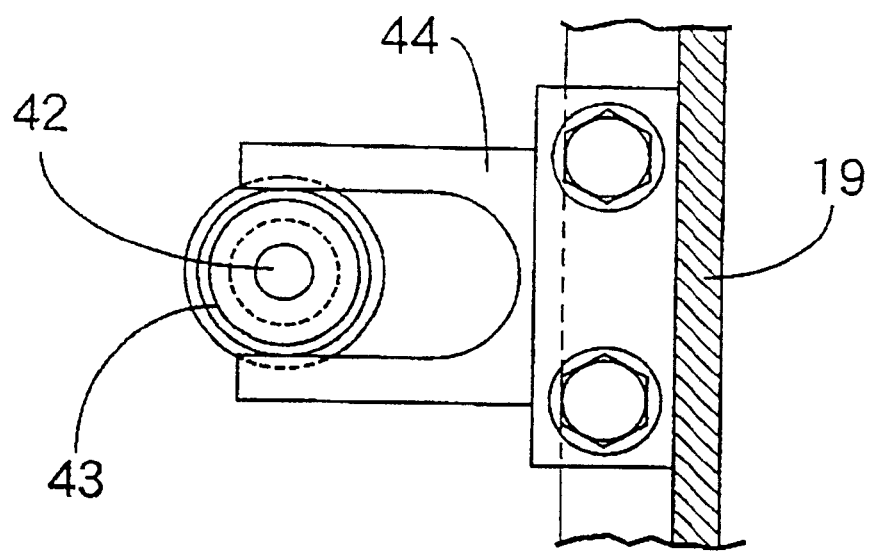
FIG. 4 is an enlarged sectional view taken along line 4—4 of FIG. 1.

As illustrated in FIGS. 3 and 4, fixed on the outer periphery of the second carrier half 34 of the carrier 29 is a shaft 42 having its axis orthogonal to the axis of the transmission shaft 26. A roller 43 is rotatably supported on the shaft 42. In the meantime, on the inner surface of the casing 19 is fastened a U-shaped restricting member 44 extending in parallel with the axis of the transmission shaft 26. The roller 43 housed in the restricting member 44 can roll; therefore the second carrier half 34 and the carrier 29 are engaged with the casing 19 so as to be movable in the direction of the axis of the transmission shaft 26 and unrotatable mounted on the axis of the transmission shaft 26.

Fastened to the second carrier half 34 of the carrier 29 is a driven screw 45 which is coaxial with the transmission shaft 26 and is in mesh with a driving screw 46 rotatably supported on the transmission shaft 26 through a ball bearing 56.

On the outer surface of the casing 19 is mounted a normally and reversely rotatable electric motor 47 having an axis parallel with the transmission shaft 26. Between the electric motor 47 and the driving screw 46 is disposed a reduction mechanism 48.

The reduction mechanism 48 includes a driving gear 49 provided on the output shaft of the electric motor 47, a first idle gear 50 in mesh with the driving gear 49, a second idle gear 51 formed unitarily with the first idle gear 50, and a driven gear 52 fastened by the driving screw 46 and in mesh with the second idle gear 51. The first and second idle gears 50 and 51 have an axis parallel with the transmission shaft 26 that is rotatably supported on an idle shaft 53 supported on the casing 19.

With the supply of a turning force from the electric motor 47 to the driving screw 46 through the reduction mechanism 48, the carrier 29 on which the driven screw 45 in mesh with the driving screw 46 is secured is movable in the axial direction of the transmission shaft 26 and is unrotatable mounted about the axis of the transmission shaft 26, being engaged with the casing 19 to move the axial direction of the transmission shaft 26.

In the continuously variable transmission 16, let A be a distance from a contact point between the friction contact surface 27a of the driving member 27 and the first friction transfer surface 40 to the axis of the transmission shaft 26, B is a distance from a contact point between the friction contact surface 27a of the driving member 27 and the first friction transfer surface 40 to the axis of the support shaft 30, C is a distance from a contact point between the friction contact surface 28a of the driven member 28 and the second friction contact surface 41 to the axis of the support shaft 30, D is a distance from a contact point between the friction contact surface 28a of the driven member 28 and the second friction contact surface 41 to the axis of the transmission shaft 26, NI is the speed of the driving member 27, NO is the speed of the driven member 28, and the gear ratio R is R=NI/NO, then the following equation is provided:

$$R=NI/NO=(B/A)\times(D/C)$$

When the driving screw 46 is turned by power from the electric motor 47 through the reduction mechanism 48, the driven screw 45 and the carrier 29 are moved to the vicinity of the driven member 28 as shown in FIG. 2, the distance C decreases with an increase in the distance B. In this case, since the distances A and D remain unchanged, the gear ratio R increases, thus increasing the distance B to a maximum while decreasing the distance C to a minimum. In this state shown in FIG. 2, the gear ratio is LOW. In the meanwhile, when the driven screw 45 and the carrier 29 are moved away from the driven member 28 as shown in FIG. 3, the distance B decreases while the distance C increases. The distances A and D remain constant, decreasing the gear ratio R and accordingly decreasing the distance B to a minimum and increasing the distance C to a maximum. In this state shown in FIG. 3 the gear ratio is TOP.

A driven gear 52 in the reduction mechanism 48 has a restricting projection 54 unitarily formed, projecting toward the wall section 19a side of the casing 19. On the wall section 19a is securely attached a stopper 55 which can be in contact with and engage with the restricting projection 54.

The angle of rotation of the driving screw 46, that is, the axial travel of the carrier 29, is restricted by the contact and engagement of the restricting projection 54 with the stopper 55.

An output gear 17 coaxially surrounding the transmission shaft 26 is disposed on the opposite side of the carrier 29 across the driven member 28. Between the inner periphery of the output gear 17 and the transmission shaft 26, an angular contact bearing 57 is interposed. The outer ring of the angular contact bearing 57 is held by the output gear 17 and a locating snap ring 58 installed on the inner periphery of the output gear 17. The end of the inner ring of the angular contact bearing 57 on the side opposite to the driven member 28 is in contact with one end of a cylindrical spacer 59 coaxially surrounding the transmission shaft 26 and inserted between the output gear 17 and the transmission shaft 26, while the other end of the spacer 59 is in contact with the retaining ring 60 mounted on the transmission shaft 26. The output gear 17, therefore, is held from moving away from the driven member 28, being rotatably supported on the transmission shaft 26. On the other hand, between the driven member 28 and the output gear 17 is interposed a disk spring 65 to preload the driven member 28 so that the driven member 28 will move away from the output gear 17, whereby the output gear 17 is substantially fixed in a position along the axis of the transmission shaft 26.

There is provided a pressure control cam mechanism 61 between the driven member 28 as the first rotating member and the output gear 17 as the second rotating member. The pressure control cam mechanism 61 includes balls 64 which are held between a plurality of recesses 62 and 63 formed on the opposed surfaces of the driven member 28 and the output gear 17. With the supply of a torque to the driven member 28 to turn the balls 64 between the driven member 28 and the output gear 17, the pressure control cam mechanism 61, as shown in FIG. 5(a), transmits the turning force from the driven member 28 to the output gear 17 while exerting a pressure to the driven member 28 in a direction in which the driven member 28 goes away from the output gear 17. The pressure cooperating with the pressure of the disk spring 65 produces a surface pressure to press the friction contact surface 27a of the driving member 27 against the first friction transfer surface 40, and a surface pressure for pressing the friction contact surface 28a of the driven member 28 against the second friction transfer surface 41.

In the neutral position in which no torque is being applied to the driven member 28 and accordingly no relative rotation is occurring between the driven member 28 and the output gear 17, there exist clearances 66, 66 between the ball 64 and the recesses 62 and 63 as shown in FIG. 5(b). The driven member 28, as shown in FIG. 5(c), can move by about 0.5 mm to the output gear 17 side so as to eliminate the clearances 66, 66.

In the inner peripheral section of the first carrier half 33 of the carrier 29, a thrust bearing 70 is mounted as a power disconnecting means. The thrust bearing 70 is mounted to push the driven member 28 to move away from the driving member 27 with the movement of the carrier 29 from LOW gear ratio to the side opposite to TOP gear ratio.

The thrust bearing 70 is mounted in the inner peripheral section of the carrier 29, so that, when the carrier 29 is in a LOW gear ratio as shown in FIG. 2, no pressure is exerted on the driven member 28 if the thrust bearing 70 is not in contact with the driven member 28 or if in contact with the driven member 28. As the carrier 29 moves from the LOW gear ratio to the opposite side of the TOP gear ratio, that is, to the right in FIG. 2, the driven member 28 is pushed by pressure to move within a range permitted by the pressure control cam mechanism 61.

Figure 6A:
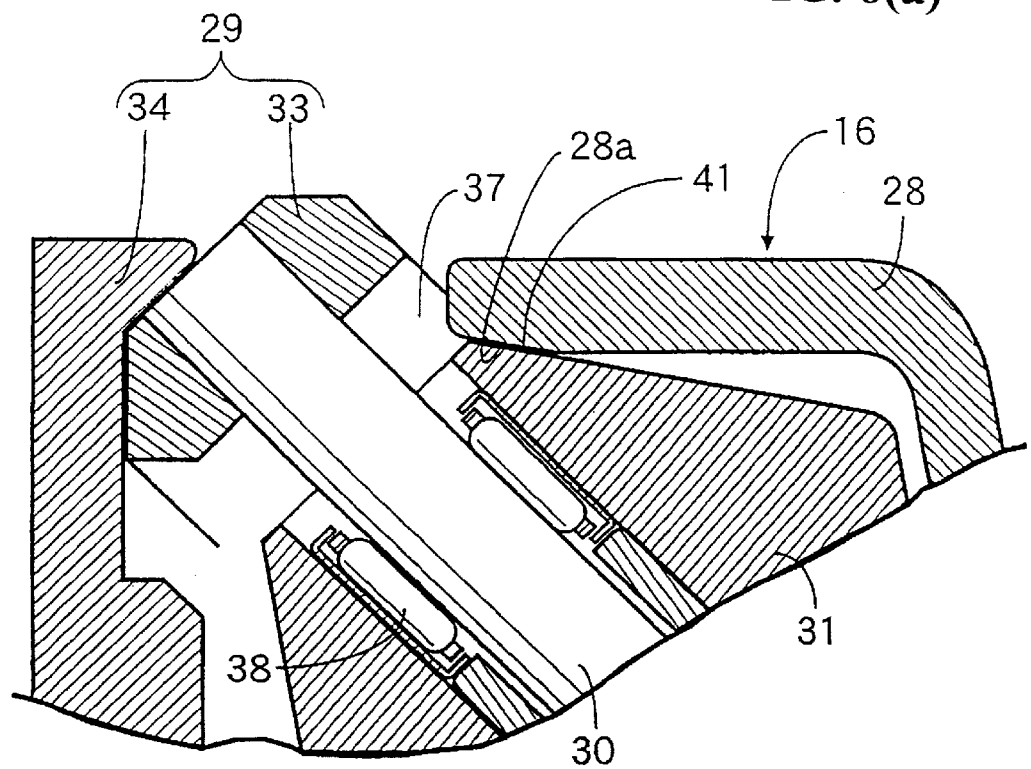
FIGS. 6(a) and 6(b) are enlarged views taken along the arrow 6 in FIG. 2.
Figure 6B:
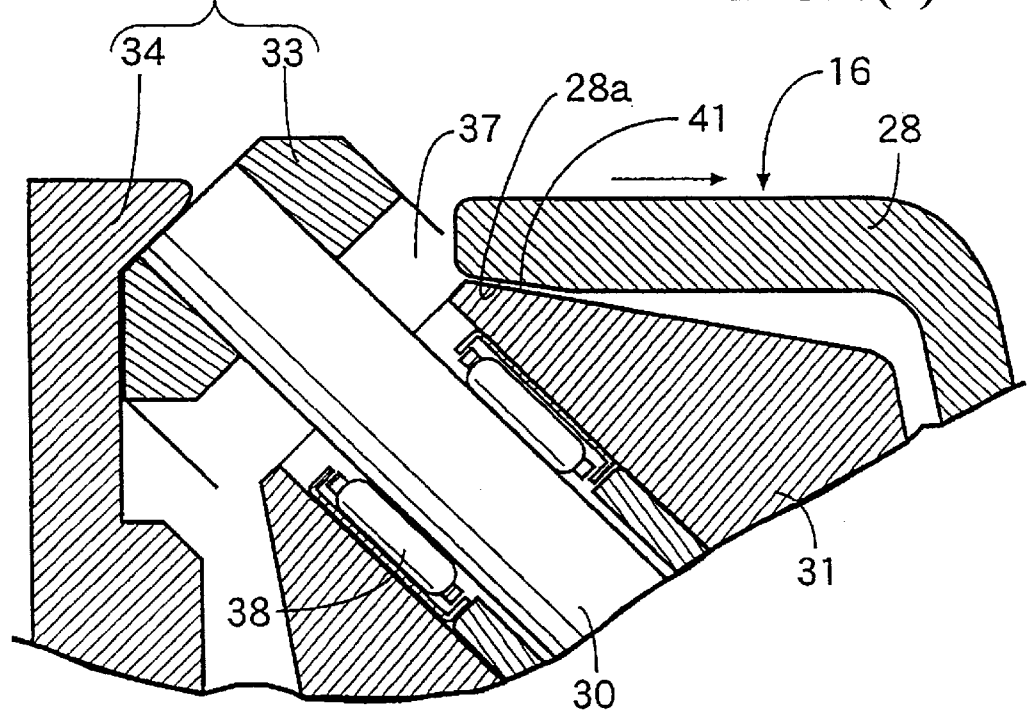

At the LOW gear ratio, as shown in FIG. 6(*a*), the second friction transfer surface 41 of the shifting rotating member 31 is in friction contact with the friction contact surface 28*a* of the driven member 28. However, the driven member 28 moves with the movement of the carrier 29 from the position of the LOW gear ratio to the opposite side of the TOP gear ratio, releasing the second friction transfer surface 41 of the shifting rotating member 31 from friction contact with the friction contact surface 28*a* of the driven member 28 as shown in FIG. 6B.

The transmission shaft 26 is rotatably supported at the other end side on ball bearings 72 mounted in the casing 19, being connected to an oil pump 71 which is a trochoid pump. In the meantime, a filter 74 is installed in the casing 19 which is exposed to the lower part in the second operating chamber 21. In the casing 19 is formed an inlet oil path 73 connecting the filter 74 with the oil pump 71. The transmission shaft 26 has a lubricating oil path 75 coaxially formed to supply the oil from the oil pump 71. A plurality of oil holes 76 are provided correspondingly to the continuously variable transmission 16, communicating at the inner end with the lubricating oil path 75 and opening at the outer end to the outer surface of the transmission shaft 26.

Another filter 77 is installed in the casing 19, correspondingly to the lower part in the first operating chamber 20. The oil cleaned by the filter 77 is supplied by another unillustrated oil pump to each part of the engine E to be lubricated through an inlet oil path 78 provided in the casing 19.

Next, the operation of the present embodiment of the continuously variable transmission 16 will be explained. The thrust bearing 70 mounted in the carrier 29 in the continuously variable transmission 16 can release the friction contact between the driven member 28 and the second friction transfer surface 41. With the release of the friction contact, power transmission from the continuously variable transmission 16 is disconnected; thus the output gear 17 is released from friction contact in the continuously variable transmission 16, which is allowed to rotate freely. The motor vehicle, such as a motorcycle, therefore, can be moved smoothly by pushing with a little force.

Furthermore, the thrust bearing 70 drives the driven member 28 which forms a part of the continuously variable transmission 16, in the axial direction of the transmission shaft 26; and therefore as compared with a conventional type which needs a neutral clutch separately from the continuously variable transmission 16, thus, it is possible to reduce the number of components and the cost.

Furthermore, the thrust bearing 70 drives the driven member 28 in the axial direction of the transmission shaft 26 with the movement of the carrier 29 from the position of the LOW gear ratio to the opposite side of the TOP gear ratio. Therefore, it is possible to interrupt power transmission from the continuously variable transmission 16 by the use of a simple mechanism relative to the position of the carrier 29; and no other special power source other than the electric motor 47 which drives the carrier 29 is required to operate the thrust bearing 70. Besides, the neutral state for disconnecting power transmission between the engine E and the rear wheel WR is achieved in accordance with the travel of the carrier 29 from the position of the LOW gear ratio to the side opposite to the TOP gear ratio, and therefore it is possible to simplify the structure for changing the LOW gear ratio to NEUTRAL.

Since the driven member 28 is pushed by the thrust bearing 70, it is possible to drive the driven member 28 to move away from the driving member 27 while restraining the occurrence of a frictional force between the driven member 28 and the carrier 29. Also because the thrust bearing 70 is mounted in the inner peripheral section of the carrier 29, and because of a small peripheral velocity in the inner peripheral section of the carrier 29, a load to be applied to the thrust bearing 70 can be decreased.

Furthermore, the pressure control cam mechanism 61 is for power transmission between the driven member 28 and the output gear 17 while producing a surface pressure to press the driving member 27 and the driven member 28 against the first and second friction transfer surfaces 40 and 41, and is disposed between the driven member 28 and the output gear 17 which is rotatable around the axis of the transmission shaft 26 without changing a position along the axial direction of the transmission shaft 26. The movement of the driven member 28 to the position where the driven member 28 is released from frictional contact with the second friction transfer surface 41 is absorbed by the pressure control cam mechanism 61. Therefore, during power transmission it is possible to achieve proper frictional contact of the driving member 27 and the driven member 28 with the first and second friction transfer surfaces 40 and 41, and, during power disconnection, to allow axial movement of the driven member 28.

Preferred embodiments of this invention have heretofore been explained. It should be understood that this invention is not limited to the above-described embodiments and various changes and modifications may be made therein without departing from the scope of this invention.

In the above-described embodiments for example, the driven member 28 is driven to move away from the driving member 27. It is to be noted that the driving member 27 may be driven to move away from the driven member 28, and also that both the driving member 27 and the driven member 28 may be driven to mutually move away from each other.

It is also possible that at least either one of the driving member 27 and the driven member 28 will be axially driven from outside.

According to the first embodiment, as described above, it is possible to move the motor vehicle such as a motorcycle with a light force by reducing the number of components and the cost.

According to the second embodiment, it is possible to achieve a power off state by the use of a continuously variable transmission of a simple structure relative to the position of the carrier. Furthermore, no other special power than the carrier driving power source is needed to operate the power disconnecting means, and according it is possible to simplify the structure for changing the LOW gear ratio to NEUTRAL.

Furthermore, according to the third embodiment, it is possible to drive the driven member to move away from the driving member while restraining occurrence of a frictional force between the driven member and the carrier, and accordingly to reduce a load acting on the thrust bearing.

Furthermore, according to the fourth embodiment, it is possible to achieve, during power transmission, proper frictional contact of the driving member and the driven member with the first and second friction transfer surfaces, and to allow axial movement of at least either one of the driving and driven members during power disconnection.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A continuously variable transmission for motor vehicles, comprising:
   a transmission shaft;
   a driving member rotated together with said transmission shaft;
   a driven member rotatably supported on said transmission shaft;
   a carrier movable along the axis of said transmission shaft;
   a support shaft including an axis along a conical generator having its centerline on the axis of said transmission shaft and being supported on said carrier; and
   a shifting rotating member having conical first and second friction transfer surfaces in frictional contact, respectively, with said driving member and driven member, and rotatably and axially slidably supported on said support shaft, wherein said continuously variable transmission includes a power disconnecting means for releasing at least one of said driving member and said driven member from frictional contact with the first and second friction transfer surfaces by driving at least one of said driving member and said driven member wherein said rotating members will move away from each other along the axis of said transmission shaft.

2. The continuously variable transmission for motor vehicles according to claim 1, wherein said power disconnecting means drives, in the axial direction of said transmission shaft, at least one of said driving member and said driven member with the movement of said carrier away from the position of a LOW gear ratio toward the side opposite to the position of a TOP gear ratio.

3. The continuously variable transmission for motor vehicles according to claim 2, wherein said driven member is rotatably supported on said transmission shaft to be movable within a limited range in the axial direction of said transmission shaft, and is spring-loaded in frictional contact with said second friction transfer surface; and a thrust bearing acting as said power disconnecting means is mounted on the inner peripheral section of said carrier, to thereby enable pushing said driven member in the axial direction of said transmission shaft with the movement of said carrier from the position of the LOW gear ratio to the side opposite to the TOP gear ratio.

4. The continuously variable transmission for motor vehicles according to claim 1, wherein, between the first rotating member, being at least one of said driving member and said driven member, and a second rotating member which is rotatable about the axis of said transmission shaft without changing the position along the axis of the transmission shaft, there is provided a pressure control cam mechanism for power transmission between said first and second rotating members while producing a surface pressure for pressing said driving member and said driven member against said first and second friction transfer surfaces, and the movement of said first rotating member towards a position for releasing at least one of said driving member and said driven member from frictional contact with said first and second friction transfer surfaces is absorbed.

5. The continuously variable transmission for motor vehicles according to claim 1, wherein said driven member receives said shifting rotating member for selectively imparting rotation from said driving member through said shifting rotating member to said driven member.

6. The continuously variable transmission for motor vehicles according to claim 1, wherein said driving member is a ring-like member secured to said transmission shaft and includes a friction contact outer surface for engaging with said shifting rotating member.

7. The continuously variable transmission for motor vehicles according to claim 4, wherein said pressure control cam includes a plurality of balls positioned within recesses formed on the opposed surfaces of the driven member and an output gear wherein a supply of torque from the driven member turns the balls between the driven member and the output gear and the pressure control cam exerts a pressure to the driven member in a direction away from the output gear.

8. A continuously variable transmission for motor vehicles, comprising:
   a transmission shaft;
   a driving member mounted on said transmission shaft for rotation together with said transmission shaft;
   a driven member rotatably supported on said transmission shaft;
   a carrier selectively movable along the axis of said transmission shaft;
   a support shaft including an axis along a conical generator having its centerline on the axis of said transmission shaft and being supported on said carrier; and
   a shifting rotating member having conical first and second friction transfer surfaces in frictional contact, respectively, with said driving member and driven member, and rotatably and axially slidably supported on said support shaft;
   a power disconnecting member for releasing at least one of said driving member and said driven member from frictional contact with the first and second friction transfer surfaces by driving at least one of said driving member and said driven member wherein said rotating members are movable away from each other along the axis of said transmission shaft.

9. The continuously variable transmission for motor vehicles according to claim 8, wherein said power disconnecting member drives, in the axial direction of said transmission shaft, at least one of said driving member and said driven member with the movement of said carrier away from the position of a LOW gear ratio toward the side opposite to the position of a TOP gear ratio.

10. The continuously variable transmission for motor vehicles according to claim 9, wherein said driven member is rotatably supported on said transmission shaft to be movable within a limited range in the axial direction of said transmission shaft, and is spring-loaded in frictional contact with said second friction transfer surface; and a thrust bearing acting as said power disconnecting member is mounted on the inner peripheral section of said carrier, to thereby enable pushing said driven member in the axial direction of said transmission shaft with the movement of said carrier from the position of the LOW gear ratio to the side opposite to the TOP gear ratio.

11. The continuously variable transmission for motor vehicles according to claim 8, wherein, between the first rotating member, being at least one of said driving member and said driven member, and a second rotating member which is rotatable about the axis of said transmission shaft without changing the position along the axis of the transmission shaft, there is provided a pressure control cam mechanism for power transmission between said first and second rotating members while producing a surface pressure for pressing said driving member and said driven member against said first and second friction transfer surfaces, and the movement of said first rotating member towards a position for releasing at least one of said driving member and said driven member from frictional contact with said first and second friction transfer surfaces is absorbed.

12. The continuously variable transmission for motor vehicles according to claim 8, wherein said driven member receives said shifting rotating member for selectively imparting rotation from said driving member through said shifting rotating member to said driven member.

13. The continuously variable transmission for motor vehicles according to claim 8, wherein said driving member is a ring-like member secured to said transmission shaft and includes a friction contact outer surface for engaging with said shifting rotating member.

14. The continuously variable transmission for motor vehicles according to claim 11, wherein said pressure control cam includes a plurality of balls positioned within recesses formed on the opposed surfaces of the driven member and an output gear wherein a supply of torque from the driven member turns the balls between the driven member and the output gear and the pressure control cam exerts a pressure to the driven member in a direction away from the output gear.

* * * * *